(No Model.) 2 Sheets—Sheet 1.

T. C. PEASE.
CUT-OFF CONVEYER FOR FLOUR SIFTING MACHINES.

No. 588,468. Patented Aug. 17, 1897.

Witnesses
Chas. H. Durand
Edwin Cruse

Inventor
T. C. Pease
By his Attorneys,
C. A. Snow & Co.

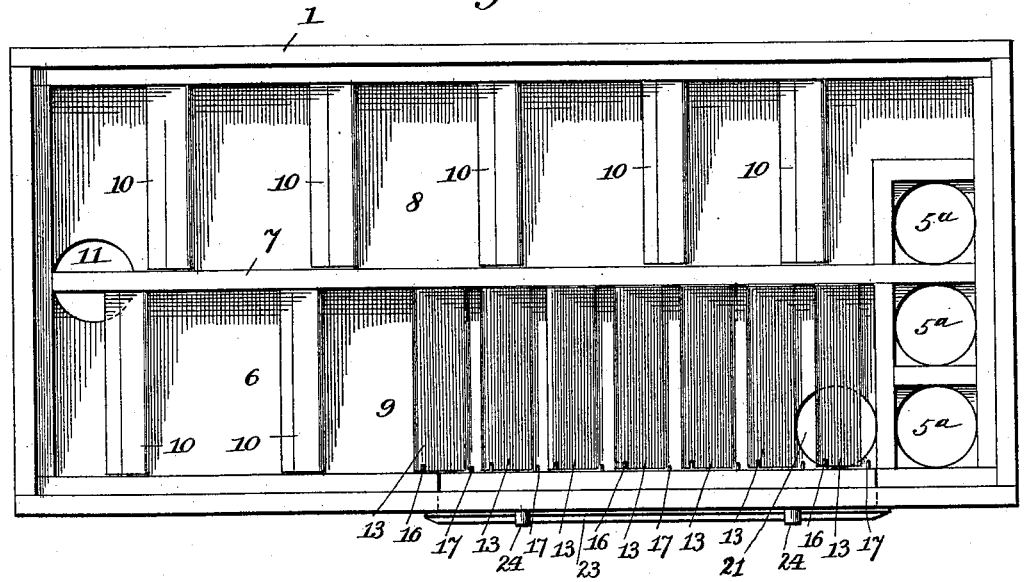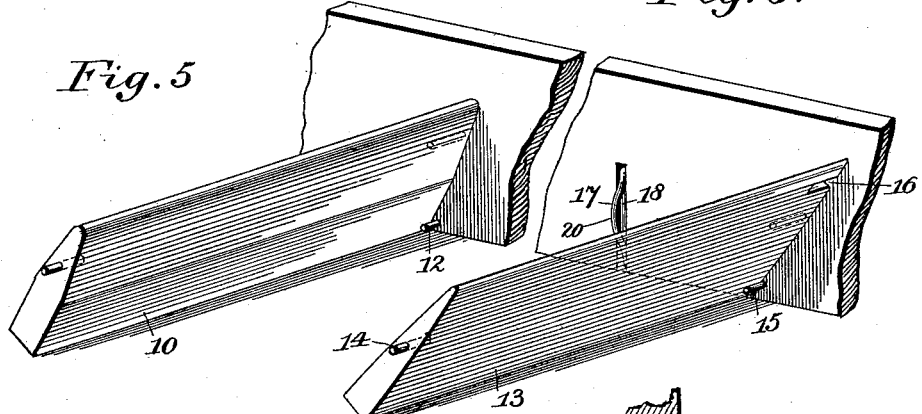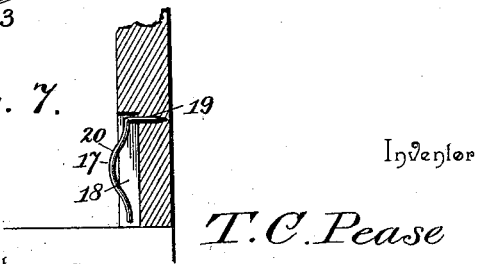

UNITED STATES PATENT OFFICE.

THEODORE C. PEASE, OF CHEROKEE, KANSAS.

CUT-OFF CONVEYER FOR FLOUR-SIFTING MACHINES.

SPECIFICATION forming part of Letters Patent No. 588,468, dated August 17, 1897.

Application filed April 27, 1897. Serial No. 634,123. (No model.)

*To all whom it may concern:*

Be it known that I, THEODORE C. PEASE, a citizen of the United States, residing at Cherokee, in the county of Crawford and State of Kansas, have invented a new and useful Cut-Off Conveyer for Flour-Sifting Machines, of which the following is a specification.

This invention relates to machines for sifting, grading, and separating the meal or chop produced by the grinding, crushing, or reduction of grain, and particularly to that class of machines in which the sieves or screens are given a bodily circular movement in a horizontal plane after the manner of hand sifting or screening.

The object of my invention is to provide machines of this character with a conveyer arranged below the lowest of the series of sieves to receive the sifted flour, in which conveyer a series of valves or gates are arranged, some of which valves are reversible for the purpose of causing the flour received in one part of the conveyer to travel in the opposite direction to that in which the flour received in the other part of the conveyer travels.

The invention will be fully described hereinafter and particularly pointed out in the claims.

Figure 1:
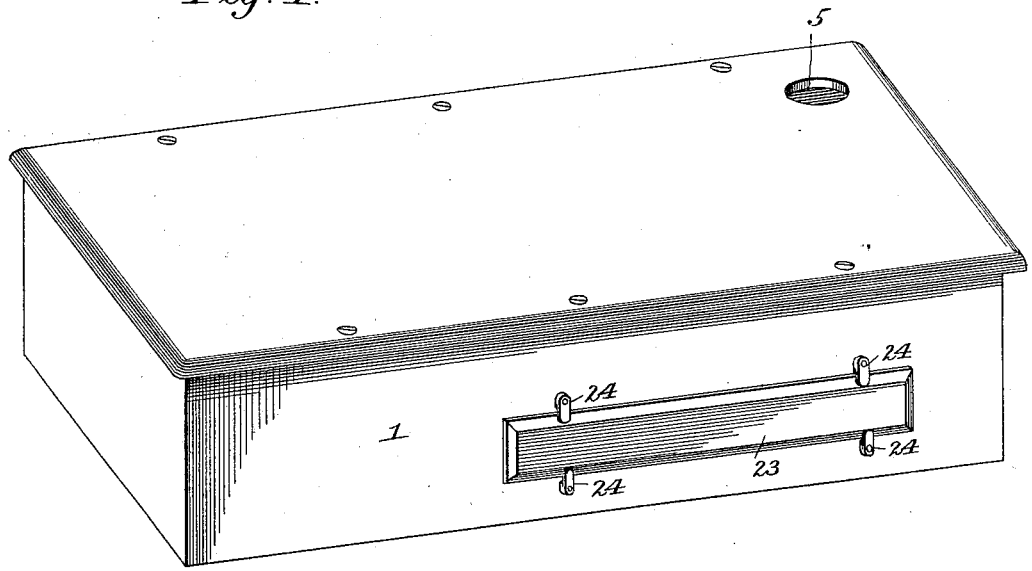
Figure 2:
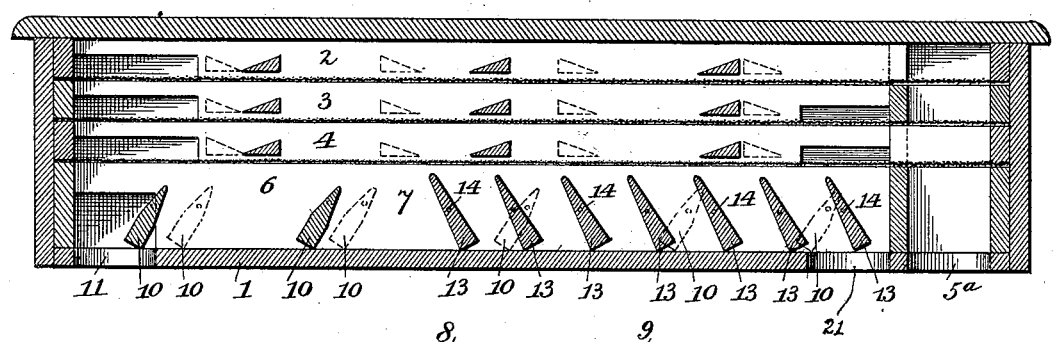
Figure 3:
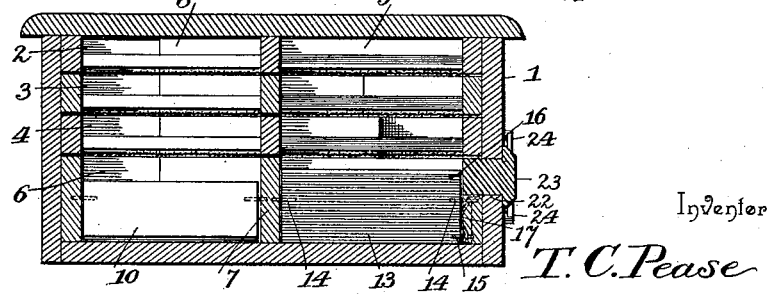

In the drawings, Figure 1 is a perspective view of a machine embodying my invention, the mechanism for operating it being omitted. Fig. 2 is a vertical longitudinal section. Fig. 3 is a vertical transverse section. Fig. 4 is a plan view of the conveyer. Figs. 5, 6, and 7 are views of detached details.

Similar reference-numerals indicate similar parts in the several figures.

1 indicates the casing, in which are mounted the sieves or screens and the conveyer. This casing may be supported and given the necessary circular movement by any suitable mechanism, which I have not deemed necessary to illustrate and describe, as it forms no part of my invention.

The sieves are indicated by 2, 3, and 4, respectively, the inlet-spout by 5, and the discharge-spouts for bran, middlings, &c., which are tailed off from the sieves, are indicated by 5ª.

6 indicates the conveyer, which is provided with a central longitudinal partition 7, thereby dividing the conveyer into two compartments, (indicated, respectively, by 8 and 9.) In the compartment 8 is arranged a series of hinged valves or gates 10, which are inclined and are heaviest at their lower ends. These valves open when the casing is moved in one direction and permit the sifted flour to pass below them, but when the casing is moved in the opposite direction these valves close by gravity and prevent the flour from moving in the opposite direction.

The valves are so arranged that the flour will be caused to move toward the discharge-opening 11. One or two similar valves may be arranged in the compartment 9 at the end nearest the discharge-opening 11, and these valves will incline in the same direction as those in the compartment 8 in order that the flour at its end of the compartment 9 may also pass to the discharge-opening 11. Pins 12 project from the side of the conveyer to engage the valves 10, near their lower ends, in order to limit the movement of the lower ends of the valves as they close to prevent their becoming jammed or stuck against the bottom of the casing and be thereby prevented from opening to permit the flour to pass under them.

13 indicates valves or gates in the compartment 9, which are pivoted at their respective ends to the side of the casing and the partition midway their width, as indicated at 14, in order to permit their being reversed. These valves are arranged much closer together than are the valves 10, and they also occupy an inclined position. They are also heavier at their lower ends than at their upper ends and will swing open when the casing is moved in one direction and close when it is moved in the opposite direction the same as the valves 10. Pins 15 project out from the side of the conveyer to engage the faces of the valves near their lower ends to limit the movement of the valves when they close, and each of the valves is provided with a recess 16 in its end and near the upper edge to permit the passage of the pins 15 when the valves are reversed. These pins are so arranged that they will engage one of the faces of the valves in either of its positions. In order to prevent these valves from being reversed by the movement of the casing, I provide springs 17, which are adapted to engage the lower ends of the valves and prevent them from moving upwardly too far. The moving part of each spring works in a recess 18, formed in the side of the conveyer. Each spring is bent at a right angle to form the pointed portion 19, which is driven into the side of the conveyer and serves to hold the spring in its proper position. The free end of the spring is provided with an outwardly-bowed portion 20, which is adapted to engage the valves and prevent their upward movement. This bowed portion may, however, be forced backward into the recess 18 and permit the valve to be reversed.

21 indicates a discharge-opening at the opposite end of the casing to that in which the discharge-opening 11 is located. In order to gain access to the valves 13, an opening 22 is formed in the casing, which opening is closed by a removable door 23. This door is held in position by turn-buttons 24 or any other suitable fastening device, and when it is necessary to gain access to the valves 13 the door 23 is removed and the operator can insert his hand through the opening and reverse as many of the valves 13 as may be necessary.

It is well known that the condition of the atmosphere and the condition of the grain materially affect the bolting or sifting of mill products. If the atmosphere is cold and dry and the grain also dry, the material will pass through the bolting-cloth very freely, or, in other words, will not require to travel over as much surface to effect the separation as it will when the atmosphere is damp or the grain damp. When the latter conditions, or either of them, prevail, it often happens that all the flour or fine material is not separated from the coarser material before it tails off of the sieve. This may be prevented by the use of my invention, for when damp conditions prevail I can put coarser cloth on the sieve just over the reversible valves and thereby permit all the fine flour to pass through the sieve. This fine flour will, however, be mixed with somewhat coarser material and should therefore be kept separate from the fine flour which has passed through the other part of the sieve. The valves 13 will therefore be inclined in a direction the reverse of that in which the valves 10 incline, and the flour which passes through the coarser cloth will therefore be discharged through the opening 21, while that passing through the finer cloth will be discharged through the opening 11. Again, when the atmosphere and grain are dry and other conditions favorable, the finest and cleanest of the product will all have passed through the cloth before it has traveled entirely over the cloth, and at the tail end and directly over the reversible valves the stock which passes through the cloth will be gray and specky, and therefore unfit to go with the high-grade flour. By the use of my invention this inferior product is kept separate from the best product and discharged through a separate opening.

It is of course to be understood that all the valves 13 or any number of them may be inclined in the same direction as the valves 10 when desired, and if all are so inclined all the flour will be discharged through the opening 11. The proportion of the material discharged through the opening 21 will be regulated entirely by the number of valves 13 inclining toward the opening, and as the valves 13 are arranged close together the point of division can be nicely arranged to suit existing circumstances.

It will be understood that changes in the form, proportion, and minor details of construction may be resorted to without departing from the spirit or sacrificing any of the advantages of this invention.

What I claim is—

1. In a machine for dressing flour, the combination with a casing adapted to be moved in opposite directions on a horizontal plane, and a series of sieves within the casing, of a conveyer arranged within the casing below the bottom sieve, said conveyer having a central longitudinal partition to divide it into two compartments, and having a discharge-opening at one end common to both compartments, and a separate discharge-opening for one compartment at its other end, a series of inclined, non-reversible, hinged valves or gates in one compartment, a series of reversible, inclined, hinged gates or valves in the other compartment, pins projecting from the sides of the conveyer to engage the lower ends of said valves to limit their movement when closing, and a removable door in the casing to afford access to the reversible valves, substantially as described.

2. In a machine for dressing flour, the combination with a casing adapted to be moved in opposite directions on a horizontal plane, and a series of sieves within the casing, of a conveyer arranged within the casing below the bottom sieve, said conveyer having a central longitudinal partition to divide it into two compartments, and having a discharge-opening at one end common to both compartments, and a separate discharge-opening for one compartment at its other end, a series of reversible inclined, hinged valves in the compartment having the separate discharge-opening, springs to engage said valves to prevent their accidental reversal, a series of non-reversible inclined, hinged valves in the other compartment, and a removable door in the casing to afford access to the reversible valves, substantially as described.

3. In a machine for dressing flour, the combination with a casing adapted to be moved in opposite directions on a horizontal plane, and a series of sieves within the casing, of a conveyer arranged within the casing below the bottom sieve, said conveyer having a central longitudinal partition to divide it into two compartments, and having a discharge-opening at one end common to both compartments, and a separate discharge-opening for one compartment at its other end, a series of hinged gravity gates or valves in each compartment, said valves being inclined and those in one compartment being reversible and those in the other non-reversible, and the reversible valves being arranged closer together than the non-reversible ones, pins projecting from the sides of the conveyer to engage the valves to limit their movement when closing, springs to engage the reversible valves to prevent their accidental reversal, and a removable door in the casing to afford access to the reversible valves, substantially as described.

In testimony that I claim the foregoing as my own I have hereto affixed my signature in the presence of two witnesses.

THEODORE C. PEASE.

Witnesses:
W. F. DOCKSTADER,
F. L. WEBSTER.